Patented Feb. 1, 1944

2,340,739

UNITED STATES PATENT OFFICE 2,340,739

VAPOR PHASE CATALYTIC OXIDATION

Charles Raymond Downs, Old Greenwich, Conn., assignor to The Calorider Corporation, Old Greenwich, Conn., a corporation of Connecticut No Drawing. Application October 30, 1940, Serial No. 363,487

1 Claim. (Cl. 260—342)

This invention relates to the improvement in processes employing air as an oxidizing medium in which the moisture or other impurities contained in air produce an unfavorable effect upon the processes. There are many processes of this type familiar to those engaged in this art where my improvement will at once be recognized as an advantage but I will refer hereinafter particularly to the catalytic oxidation of organic compounds in the vapor phase.

In the oxidation of organic compounds with air to form partial oxidation products, a part of the compound oxidized usually undergoes complete combustion to carbon dioxide and water. Hence the gaseous products of the reaction always contain some water vapor. In addition, more or less water is introduced in the air used for the oxidation to a degree dependent on the atmospheric temperature and relative humidity. In cases where the partial oxidation products can combine with water, it is often impossible to condense them without such combination taking place.

As a specific example of such conditions, the invention will be described as it concerns the production of maleic anhydride from benzene or other suitable organic raw material. When benzene for example is converted into maleic anhydride at least two concurrent reactions take place, namely, the partial oxidation of benzene to maleic anhydride and the complete combustion of a part of the benzene to carbon dioxide and water or the complete combustion of the intermediate product—maleic anhydride—to carbon dioxide and water. Improved catalysts and improved methods and apparatus for the control of the temperature of the reaction contribute toward reducing the proportion of the complete combustion reaction but none of these improvements has succeeded in eliminating this reaction. Consequently water, formed by the reaction, is always present in the gaseous products of reaction. If the gaseous products leaving the catalyst chamber in the neighborhood of 450° C. are cooled sufficiently to condense water, the maleic anhydride is converted in substantial part at least to maleic acid. Maleic anhydride, being the desired compound for the production of synthetic resins, must then be produced by decomposition of the maleic acid which is a wasteful and expensive process.

It is therefore desirable to have a minimum amount of moisture in the gaseous products of reaction. Although this objective is partly attained by improved catalysts and apparatus as mentioned above, it does not take into account the moisture already present in the air used for the oxidation which is added to the water from the complete combustion reaction. In humid weather this is a very considerable quantity because ordinarily the amount of air used is 25 or more times the amount of the benzene introduced into the catalytic chamber. The moisture dewpoint of the gaseous products of reaction is thereby increased making more difficult the direct recovery of maleic anhydride.

In order to accomplish a suitable degree of dehydration of air for this purpose, low temperature cooling has been employed. This has proven expensive in operation because of the necessity for cooling large volumes of air, whose moisture content varies from time to time, to a constant dewpoint.

Proposals have also been made to dry the air by means of solid adsorbents such as silica gel, activated alumina and the like. In practice, these materials present several disadvantages, one of them being that the air leaving contact with the solid beds of adsorbents fluctuates as to its moisture content with fluctuations in the moisture content of the air supplied to the beds. Hygroscopic solids such as fused calcium chloride have been suggested by Miller in U. S. Patent No. 2,215,070 but these are not practicable because of the difficulty experienced in their reactivation. Moreover, when large quantities of air are passed rapidly over such materials, their surfaces are prone to deliquesce, forming a solution which is less hygroscopic than the solids themselves. The moisture content of the air is greater than should be obtained theoretically by contact with the solid itself and furthermore the air may contain very small traces of the entrained hygroscopic material. The use of hygroscopic solutions of inorganic acids, salts and other soluble inorganic materials have been considered. Acids, such as sulphuric acid, are active corrosive agents and moreover entrained fog would be detrimental, particularly where organic compounds are to be oxidized. In those cases where the tail gases from the reaction train are recycled for mixing with fresh increments of the organic compound to be oxidized, destruction of the organic compounds in the recycled gas and of the sulphuric acid would result. Hygroscopic solutions of salts and other compounds containing inorganic constituents are known which are not particularly corrosive toward equipment or destructive of the organic compounds to be oxidized. They are sufficiently hygroscopic for the purpose and when employed under certain conditions their regeneration may be carried out automatically at low cost and air of fluctuating moisture content may be treated by them to dry it to a selected constant moisture content. It is however difficult completely to prevent entrainment of minute quantities of the solutions. If the air is to be used for ordinary purposes, the amount of entrained salt is so minute as to be inconsequential.

I have found, however, that even these small traces of salts in the air are sufficient to adversely affect some catalytic reactions. This is probably due to the fact that catalytic oxidation reactions generally are continuous in their operation over periods of many months duration and the adverse effect of such impurities in the air is not immediately traceable as a source of catalyst depreciation. Although I do not limit myself by any theoretical explanation of the reduction in catalytic productivity, it appears that this is due, in part at least, to accumulation of the entrained salt in the catalyst mass.

J. M. Weiss (U. S. Patents 2,206,377 and 2,209,908) has shown that very small amounts of alkali metals such as lithium, magnesium and calcium among others may have a marked detrimental effect upon catalysts used for this purpose. Solutions of the chlorides and bromides of these elements are commonly used for drying of air and this appears to substantiate my theory of catalyst depreciation when such solutions are used. In any event, I have found that all the difficulties described above may be obviated by employing certain organic liquids to dehumidify the air, such as polyhydric alcohols and the like, preferably using them according to the methods and in the apparatus described in U. S. Patent No. 2,221,787 of which I am co-inventor.

Among the hygroscopic liquids available for this purpose I may use, for example, triethyleneglycol because of its marked hygroscopic properties, its stability and its low vapor pressure. It is also a very efficient scrubbing medium thereby producing clean air and preventing the catalyst mass from being obstructed or depreciated by dust and inorganic impurities or catalyst poisons such as salts which may be present in the raw air. The extremely small amounts of the triethyleneglycol which are carried as vapors or entrained into the catalyst mass do not interfere with the action of the catalyst and do not contaminate the recovered product.

Maleic anhydride may also be produced by the oxidation of other organic compounds, for example the butylenes, butadiene, furfural and various aliphatic hydrocarbons and my invention is obviously applicable in these cases as well as the one specifically described.

Other vapor phase catalytic processes benefit by the use of my invention. For example, in the catalytic oxidation of naphthalene to phthalic anhydride, maleic anhydride is also formed in small amounts as a byproduct and when this condenses along with water in the condensing chambers the maleic acid causes serious corrosion of the chambers. Pre-dried air for this reaction reduces the seriousness of this corrosion. Similar improvement may be obtained by my process in the catalytic oxidation of anthracene to anthraquinone and of toluene to benzaldehyde and benzoic acid but I do not intend to be limited solely to these catalytic processes.

My process consists essentially of drying atmospheric air to a selected low dewpoint by contact with hygroscopic liquids which contain no inorganic compounds which have a deleterious effect upon catalysts, and passing this air mixed with the vapors of a compound to be oxidized to products of partial oxidation into contact with a suitable catalyst thereby reducing the quantity of moisture in the reaction products and facilitating the recovery of the desired products. Likewise I contemplate the mixture of the air and organic compound before the drying operation and passing the dried mixture into contact with the catalyst.

Having thus described my invention I claim:

In the art of vapor phase catalytic oxidation of hydrocarbons to maleic anhydride by means of air the improvement of drying the air to permit the recovery of said maleic anhydride which comprises drying the air to a moisture-unsaturated state and a low dewpoint by contact with a liquid containing triethyleneglycol, mixing the dried air with the vapor of the hydrocarbon, conducting the mixture through the catalyst mass and recovering the maleic anhydride by cooling the products of the oxidation below the dewpoint of the maleic anhydride.

CHARLES RAYMOND DOWNS.